J. B. HOLDEN.
GUARD FOR MACHINERY.
APPLICATION FILED FEB. 19, 1917.
1,228,920.
Patented June 5, 1917.
2 SHEETS—SHEET 2.
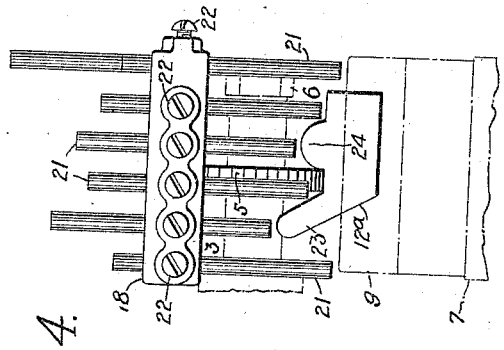
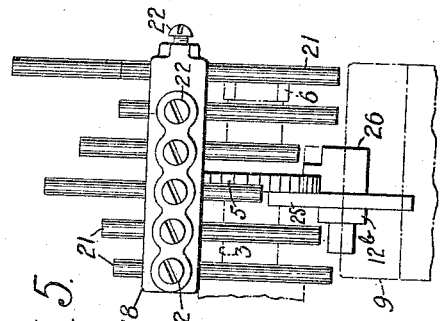
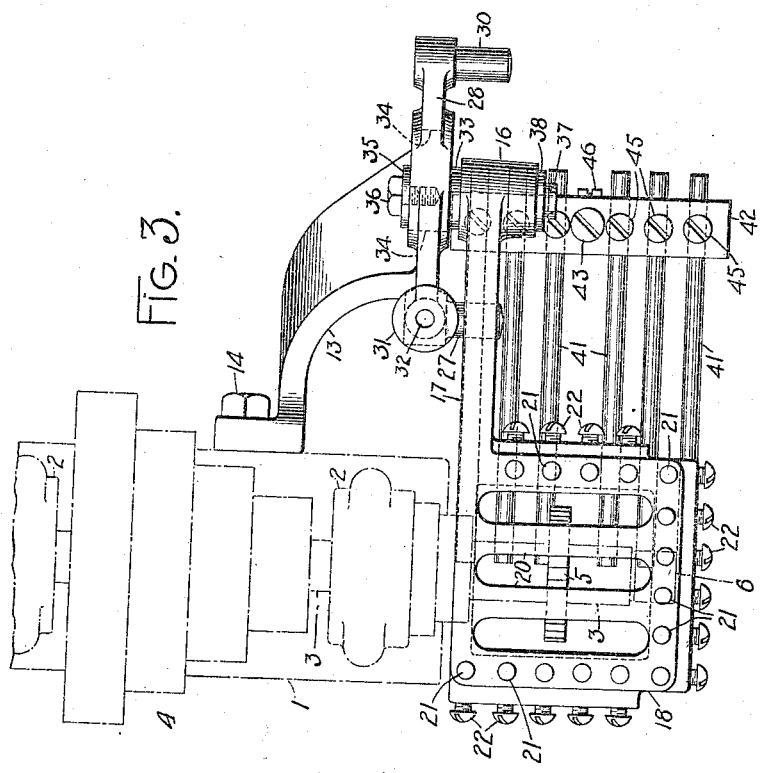
WITNESSES
E. M. Wells
R. H. Strother
INVENTOR
Joseph B. Holden
By Jacob Felbel
HIS ATTORNEY

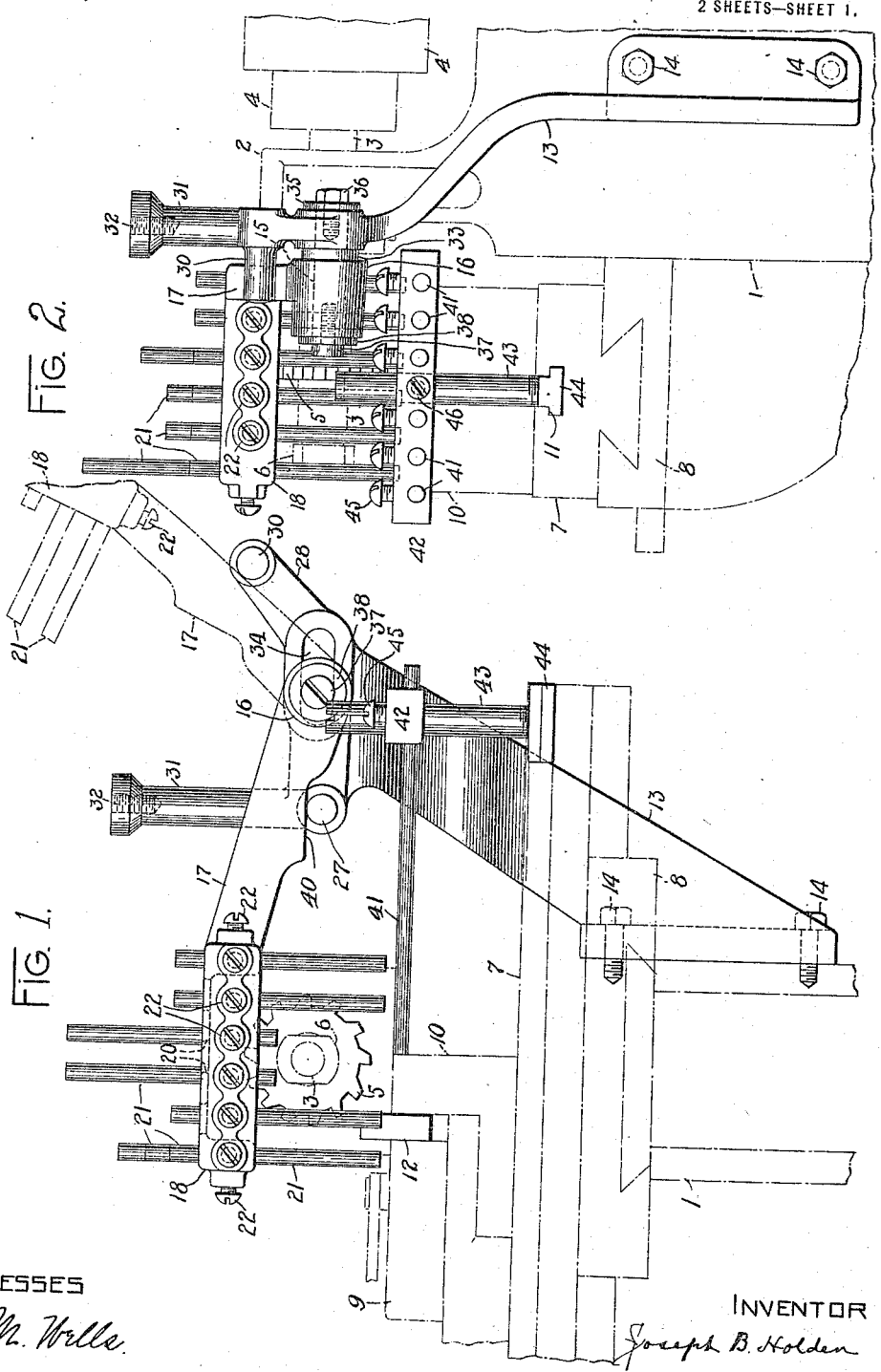

UNITED STATES PATENT OFFICE.

JOSEPH B. HOLDEN, OF SYRACUSE, NEW YORK.

GUARD FOR MACHINERY.

1,228,920.   Specification of Letters Patent.   Patented June 5, 1917.

Application filed February 19, 1917. Serial No. 149,598.

*To all whom it may concern:*

Be it known that I, JOSEPH B. HOLDEN, a citizen of the United States, and resident of Syracuse, in the county of Onondaga, and State of New York, have invented certain new and useful Improvements in Guards for Machinery, of which the following is a specification.

My invention relates to guards for protecting the operator of machine tools against injury. Heretofore cage-like or fence-like guards have been provided for cutters, but in such instances these contrivances have not been so constructed as that they are adapted for use in connection with all sizes and shapes of tools and all sizes and shapes of work-pieces.

The principal object of my invention is to provide a universal guard for the cutters or other dangerous parts of machine tools, (such for example as milling machines) said guard being of such character that its members can be relatively adjusted and arranged for different shaped pieces of work, and for different sized or shaped cutters, etc.

To the above and other ends my invention consists in certain features of construction and combinations and arrangements of parts, all of which will be fully set forth herein and particularly pointed out in the claims.

One form of my invention is illustrated in the accompanying drawings, in which—

Figure 1 is a side elevation;

Fig. 2 a rear elevation;

Fig. 3 a top plan view; and

Figs. 4 and 5 partial front views illustrating different adjustments of the guard, to adapt it to different pieces of work.

The precise form and mounting of the guard will vary, depending on the particular machine on which it is intended to be used. In the present instance the guard is shown mounted on a machine tool which is known in the trade as the Van Norman miller, some parts of which machine are indicated in broken lines in the drawing.

The machine frame comprises a column 1 having bearings 2 for a spindle 3, which spindle carries a cone pulley 4 between the two bearings; and on the projecting part of said spindle any suitable cutter or other tool 5 can be arranged and secured in place in the usual way by sleeves and a nut 6 screwed on to the end of the spindle. A table 7 reciprocates in ways 8, and said table carries a vise having jaws 9 and 10 between which can be secured a piece of work 12. The table has an undercut groove 11, which enables the vise to be adjusted lengthwise thereof, and suitable means are provided for working the jaws of the vise and for reciprocating the table to move the work 12 under the cutter 5.

As applied to this particular machine my guard includes two parts, one of which is mounted on a stationary part of the machine and the other on the reciprocating table 7. The stationary part is supported by a bracket 13 secured to the column 1 by means of bolts 14 and extending upward at a suitable inclination. At its upper part said bracket has secured thereto a pivot stud 15, Fig. 2, on which is pivoted the hub 16 of an arm 17, which arm at its forward end carries or has integral therewith a rectangular frame 18 which frame lies horizontally above the cutter 5. As here shown the frame is formed with transverse bars 20 with slots between them, which enable the operator to see the cutter but prevent his hand from coming in contact therewith during the operation of the machine. One side of this frame lies so close to the bearing part 2 of the machine as to leave no danger of the operator getting against the cutter from that direction. The remaining three sides of the frame, however, are formed with vertical holes through which pass a series of adjustable guard rods 21, said rods projecting downward from the frame and each of them being independently secured in position in said frame by a set screw 22. The series of rods 21, constitutes a fence around the cutter to protect the operator but without preventing him from seeing the cutter and the work. Each of these rods is vertically adjustable independently of the other rods and is held in its adjusted position by its set screw 22. In the practical use of these machines the same cut has to be made in the same shaped piece over and over again and the machine is set at the beginning of a job to adapt it to the particular sort of work that is to be run off. In Figs. 4 and 5 there are shown two adjustments of the front rods 21. In Fig. 4 the two end rods of the series are adjusted down near to the level of the vice jaws 9 and 10. The piece of work shown in this figure has a projection 23 to clear which the second rod 21 is adjusted upward as shown. The third rod from the left is adjusted to a lower postion as far as the shape of the work will allow and the fourth rod is adjusted somewhat upward to clear another projection 24 on the work piece, and the fifth rod is also adjusted as shown to clear the work by a margin so narrow as to obviate any chance of the operator's hand getting beyond the guard. In Fig. 5 there is shown a work piece 12ᵇ of different shape. Here the two end rods are again adjusted down to terminate a little above the vice, the second rod is adjusted a little higher and the third rod considerably higher in order to clear the part 25 of the work. The fourth rod is adjusted not so high as the third but to an elevation suitable to clear the hub 26 on the work piece and the fifth and sixth rods are adjusted down to clear the vise.

In Fig. 1 the side rods are shown. In this instance all of said rods are adjusted to a position to just clear the jaws of the vise, except the two middle ones which are adjusted quite high on account of the fact that in this particular instance the nut 6 on the end of the spindle 3, projects so far toward the side of the machine as to necessitate this adjustment. In all of the figures of the drawing the rear row of rods 21 are shown adjusted down to clear the vise but these rods are preferably adjustable like the rest in case any piece of work should be used that projected so far toward the rear as to necessitate such an adjustment. It will be understood that in this machine the vise itself is removable and there may be other classes of work in which a lower vise and a cutter of larger diameter are employed, in which case all of the rods that were adjusted merely to clear the vise, would be adjusted lower than shown in the drawings.

In order to facilitate the changing of cutters and otherwise setting the machine for a new piece of work the guard is so arranged that it can be tilted back out of the way as shown in broken lines in Fig. 1. Said guard when in its normal operative position has its arm 17 resting on a stop consisting of a stud or lug 27 projecting from the bracket 13 forward of the pivot 15 and said bracket is formed with an arm 28 extending upward and rearward and having projecting laterally therefrom a second stud or lug 30 against which the arm 17 rests when the guard is tilted back out of the way. In the present instance this whole bracket including the lugs 27 and 30 is shown as an integral casting. I have also shown projecting upward from said bracket a post 31 having a screw-hole 32 in its upper end to support an oil cup to allow oil to drop on to the cutter when the latter is in use.

There may be some peculiar conditions under which it may be desirable to adjust the entire guard in front and back direction. In order to enable such an adjustment to be made the pivot stud 15 is formed with a flange 33, Fig. 2, which bears against the face of the bracket 13 and said stud is formed with a reduced part that passes through said bracket. The bracket is formed with a horizontal slot 34 through which the stud passes and in which said stud can be adjusted front and back. On the opposite side of the bracket 13 from the flange 33 there is placed a washer 35, and a bolt 36, screwed into the end of the stud, clamps the washer 35 and the flange 33 against the bracket and holds the stud in adjusted position. The hub 16 is held on to the stud by a screw 37 and washer 38. The arm 17 is formed with a horizontal lower edge 40, Fig. 1, at the point where it rests on the lug 27 so that this arm will occupy the same position up and down in whatever position the pivot may be adjusted.

When the table 7 is drawn forward to put in a new work piece 12 the space beneath the cutter would involve some degree of danger to the operator, as for instance in case he should reach in to brush chippings or other objects from the surface of the table. To guard against injury under these conditions I have provided a second part of the guard comprising rods 41 arranged horizontally and longitudinally of the table 7. These rods pass through horizontal holes in a cross piece 42, which cross piece is adjustably mounted on a post 43 which post at its lower end is screwed into a T-shaped block 44 lying in the undercut groove 11 of the table. Each of the rods 41 is secured in place in the cross bar 42 by means of a set screw 45 screwed into said cross bar from the top. The said cross bar is adjustable up and down on the post 43 and can be secured in adjusted position by means of a set screw 46, Fig. 2. The construction is such that the post 43 can be adjusted along the slot 11 to any desired position and can be secured in adjusted position by screwing it down in the block 44, the lower end of the post pressing against the bottom of the slot and forcing the T-shaped block 44 into clamping engagement with the undercuts of the slot. The post 43 is formed at its upper end with a slot to accommodate a screw driver as shown in Fig. 1. All of the rods 41 can be adjusted up and down by adjusting the cross piece 42 and each of said rods can be separately adjusted front and back in said cross piece and secured in adjusted position by tightening the set screw 45.

In the drawing all of the rods 41 are shown adjusted to such position that their forward ends come against the rear jaw 10 of the vise so as completely to close the space at the back of the vise and beneath the cutter; but they can be otherwise adjusted, as required. The spaces between the rods are such as to allow the chippings to fall to the table and to allow any other small object to fall through. These rods 41 being mounted on the table move back and forth with the vise, so that this space is always closed to prevent the operator's hand from coming in contact with the cutter from beneath.

It will be perceived that I have provided a guard which, at least in so far as the particular machine to which it is applied is concerned, may aptly be termed a universal guard, as it is capable of being readily adjusted to different sizes of cutters and different forms of vises and different pieces of work, the guard in each adjustment thereof providing the greatest possible protection to the operator of the machine, as I have demonstrated in actual practice.

It will of course be understood that the details of construction can be varied considerably without departing from my invention.

What I claim as new and desire to secure by Letters Patent, is:

1. In a machine guard, the combination of a support and a series of guard rods, each independently adjustably mounted in said support.

2. In a machine guard, the combination of a support and rods arranged in a row, together constituting a fence, said rods being individually adjustable for the purpose set forth.

3. In a machine having a cutter, a guard comprising a support lying above the cutter and a series of depending rods constituting a fence around said cutter, said rods being individually adjustable to clear work pieces of different shapes.

4. In a machine having a cutter, the combination of a guard piece lying above the cutter and formed with sight openings and a series of guard rods mounted vertically in said guard piece and individually adjustable up and down for the purpose set forth.

5. In a machine guard, the combination of a pivoted supporting piece and a series of rods, said rods together constituting a fence, and said rods being individually adjustable for different kinds of work and said supporting piece being capable of turning about its pivot to inoperative position.

6. In a machine guard for a machine tool, the combination of a bracket mounted on the frame work of the machine tool, a guard piece pivoted to said bracket and lying over the cutter but capable of being turned to inoperative position, and a series of guard pieces mounted on said pivoted guard piece and individually adjustable as required by different jobs.

7. In a machine guard for a machine tool having a cutter and a traveling table, the combination of a stationary guard over and about said cutter, and a guard for the under side of said cutter mounted on said traveling table.

8. In a machine guard for a machine tool having a cutter and a traveling work table, the combination of a stationary guard over and about said cutter, and a guard for the under side of said cutter mounted on said traveling table, each of said guards comprising individually adjustable guard pieces to adapt the device for different jobs.

9. In a machine guard for machine tools having a cutter and a traveling table, the combination of a stationary guard including individually adjustable guard pieces, and a traveling guard mounted on said table.

10. In a machine guard for machine tools having a traveling work table and a cutter, the combination of a support mounted on said table, a cross piece adjustably mounted on said support, and guard members adjustably mounted on said cross piece whereby said guard members travel with said table and protect the operator when the work is withdrawn from the cutter.

11. In a guard for a machine tool, the combination of a bracket mounted on the stationary framework of said tool, a guard pivotally mounted on said bracket with provision for adjustment of said pivot, whereby said guard can be turned to operative and inoperative positions, and whereby its operative position can be regulated, and said guard comprising guard pieces individually adjustable as required by different jobs.

12. A machine guard comprising a frame and a series of rods disposed around the edges of said frame and individually adjustable as required by different jobs.

13. A machine guard comprising a series of rods horizontally disposed and individually longitudinally adjustable.

Signed at Syracuse, in the county of Onondaga, and State of New York, this 14th day of February, A. D. 1917.

JOSEPH B. HOLDEN.

Witnesses:
H. E. BRIDGWATER,
F. S. LEWIS.